US011526698B2

(12) United States Patent
Lee et al.

(10) Patent No.: US 11,526,698 B2
(45) Date of Patent: Dec. 13, 2022

(54) UNIFIED REFERRING VIDEO OBJECT SEGMENTATION NETWORK

(71) Applicant: ADOBE INC., San Jose, CA (US)

(72) Inventors: Joon-Young Lee, San Jose, CA (US); Seonguk Seo, Seoul (KR)

(73) Assignee: ADOBE INC., San Jose, CA (US)

( * ) Notice: Subject to any disclaimer, the term of this patent is extended or adjusted under 35 U.S.C. 154(b) by 168 days.

(21) Appl. No.: 16/893,803

(22) Filed: Jun. 5, 2020

(65) Prior Publication Data
US 2021/0383171 A1 Dec. 9, 2021

(51) Int. Cl.
| G06K 9/62 | (2022.01) |
| G06T 9/00 | (2006.01) |
| G06V 20/40 | (2022.01) |
| G06V 10/82 | (2022.01) |
| G06N 3/04 | (2006.01) |
| G06N 3/08 | (2006.01) |

(52) U.S. Cl.
CPC ............ G06K 9/6262 (2013.01); G06T 9/002 (2013.01); G06V 20/49 (2022.01)

(58) Field of Classification Search
None
See application file for complete search history.

(56) References Cited

U.S. PATENT DOCUMENTS

| 9,478,039 | B1 * | 10/2016 | Wang | G06T 7/11 |
| 10,810,435 | B2 * | 10/2020 | Lee | G06V 20/70 |
| 10,936,912 | B2 * | 3/2021 | Nakano | G06V 10/454 |
| 2017/0127046 | A1 * | 5/2017 | Das | G06T 5/002 |
| 2018/0197294 | A1 * | 7/2018 | Pan | G06V 10/255 |
| 2019/0311202 | A1 * | 10/2019 | Lee | G06T 9/002 |
| 2020/0090316 | A1 * | 3/2020 | Man | G06T 7/11 |
| 2020/0175324 | A1 * | 6/2020 | Takahashi | G06K 9/6257 |
| 2021/0027098 | A1 * | 1/2021 | Ge | G06K 9/6256 |
| 2021/0279527 | A1 * | 9/2021 | Zadeh | G06F 16/7837 |

FOREIGN PATENT DOCUMENTS

| CN | 100426719 C | * 10/2008 | |
| WO | WO-2015025189 A1 | * 2/2015 | ....... G06F 17/30867 |
| WO | WO-2017112813 A1 | * 6/2017 | ....... G06F 16/90332 |

OTHER PUBLICATIONS

Arnaud Benard, et al. "Interactive Video Object Segmentation in The Wild", arXiv preprint arXiv:1801.00269, 2017, 7 pages.
Sergi Caeiies, et al., "One-Shot Video Object Segmentation", in CVPR, 2017, 10 pages.

(Continued)

*Primary Examiner* — Mohammed Rachedine
(74) *Attorney, Agent, or Firm* — F. Chau & Associates, LLC

(57) ABSTRACT

Systems and methods for video object segmentation are described. Embodiments of systems and methods may receive a referral expression and a video comprising a plurality of image frames, generate a first image mask based on the referral expression and a first image frame of the plurality of image frames, generate a second image mask based on the referral expression, the first image frame, the first image mask, and a second image frame of the plurality of image frames, and generate annotation information for the video including the first image mask overlaid on the first image frame and the second image mask overlaid on the second image frame.

20 Claims, 8 Drawing Sheets

(56) References Cited

OTHER PUBLICATIONS

Sergi Caeiies, et al. "The 2018 Davis Challenge on Video Object Segmentation", arXiv preprint arXiv:1803.00557, 2018, 4 pages.
Yuhua Chen, et al., "Blazingly Fast Video Object Segmentation With Pixel-Wise Metric Learning", in CVPR, 2018, 10 pages.
Chenyou Fan, et al., "Heterogeneous Memory Enhanced Multimodal Attention Model for Video Question Answering", in CVPR, 2019, 9 pages.
Kirill Gavriiyuk, et al., "Actor and Action Video Segmentation From a Sentence", in CVPR, 2018, 9 pages.
Vikash Goel, et al. "Unsupervised Video Object Segmentation for Deep Reinforcement Learning", in NIPS, 2018, 12 pages.
Ronghang Hu, et al., "Segmentation From Natural Language Expressions", in ECCV, 2016, 25 pages.
Hueihan Jhuang, et al., "Towards Understanding Action Recognition", in CVPR, 2013, 8 pages.
Anna Khoreva, et al., "Video Object Segmentation With Language Referring Expressions", in ACCV, 2018, 24 pages.
Ruiyu Li, et al., "Referring Image Segmentation via Recurrent Refinement Networks", in CVPR, 2018, 9 pages.
Xiaoxiao Li, et al., "Video Object Segmentation With Joint Re-Identification and Attention-Aware Mask Propagation", in ECCV, 2018, 16 pages.
Zhenyang Li, et al., "Tracking by Natural Language Specification", in CVPR, 2017, 9 pages.
Chenxi Liu, et al., "Recurrent Multimodal Interaction for Referring Image Segmentation", in ICCV, 2017, 10 pages.
Xihui Liu, et al, "Improving Referring Expression Grounding With Cross-Modal Attention-Guided Erasing", in CVPR, 2019, 10 pages.
Edgar Margffoy-Tuay, et al., "Dynamic Multimodal Instance Segmentation Guided by Natural Language Queries", in ECCV, 2018, 16 pages.
Varun K Nagaraja, et al., "Modeling Context Between Objects for Referring Expression Understanding", in ECCV, 2016, 16 pages.
Seoung Wug Oh, et al., "Fast User-Guided Video Object Segmentation by Interaction-And-Propagation Networks", in CVPR, 2019, 10 pages.
Seoung Wug Oh, et al., "Video Object Segmentation Using Space-Time Memory Networks", in ICCV, 2019, 10 pages.
Jiangmiao Pang, et al., "Libra R-CNN: Towards Balanced Learning for Object Detection", in CVPR, 2019, 10 pages.
Federico Perazzi, et al., "Learning Video Object Segmentation From Static Images", in CVPR, 2017, 10 pages.
Federico Perazzi, et al., "A Benchmark Dataset and Evaluation Methodology for Video Object Segmentation", in CVPR, 2016, 9 pages.
Ashish Vaswani, et al., "Attention is All You Need", in NIPS, 2017, 11 pages.
Paul Voigtlaender, et al., "FEELOVS: Fast End-to-End Embedding Learning for Video Object Segmentation", in CVPR, 2019, 10 pages.
Wenguan Wang, et al., "Learning Unsupervised Video Object Segmentation Through Visual Attention", in CVPR, 2019, 11 pages.
Seoung Wug Oh, et al., "Fast Video Object Segmentation by Reference-Guided Mask Propagation", in CVPR, 2018, 10 pages.
Chenliang Xu, et al., "Can Humans Fly? Action Understanding With Multiple Classes of Actors", in CVPR, 2015, 10 pages.
Ning Xu, et al., "Youtube-VOS: Sequence-to-Sequence Video Object Segmentation", in ECCV, 2018, 17 pages.
Linjie Yang, et al., "Efficient Video Object Segmentation Via Network Modulation", in CVPR, 2018, 9 pages.
Linwei Ye, et al. "Cross-Modal Self-Attention Network for Referring Image Segmentation", in CVPR, 2019, 10 pages.
Licheng Yu, et al., "MATTNET: Modular Attention Network for Referring Expression Comprehension", in CVPR, 2018, 9 pages.
Andrew Brock, et al. "Large Scale GAN Training for High Fidelity Natural Image Synthesis", in ICLR, 2019, 35 pages.
Ding Liu, et al., "Non-Local Recurrent Network for Image Restoration", in NIPS, 2018, 10 pages.
Hengcan Shi, et al., "Key-Word-Aware Network for Referring Expression Image Segmentation", in Proceedings of the European Conference on Computer Vision (ECCV), pp. 38-54, 2018, 17 pages.
Junhua Mao, et al., "Generation and Comprehension of Unambiguous Object Descriptions", in CVPR, 2016, 10 pages.
Kaiming He, et al. "Mask R-CNN", in CVPR, 2017, 9 pages.
Nitish Srivastava, et al., "Dropout: a Simple Way to Prevent Neural Networks From Overfitting", The journal of machine learning research, 15(1):1929-1958, 2014, 30 pages.
Philipp Krahenbühl, et al. "Efficient Inference in Fully Connected CRFS With Gaussian Edge Potentials", in NIPS, 2011, 9 pages.
Tsung-Yi Lin, et al., "Microsoft COCO: Common Objects in Context", in ECCV, 2014, 15 pages.
Xiaolong Wang, et al., "Non-Local Neural Networks", in CVPR, 2018, 10 pages.
Xingyu Liao, et al., "Video-Based Person Re-Identification via 3D Convolutional Networks and Non-Local Attention", in ACCV, 2018, 9 pages.

* cited by examiner

UNIFIED REFERRING VIDEO OBJECT SEGMENTATION NETWORK

BACKGROUND

The following relates generally to image processing, and more specifically to video object segmentation.

Object segmentation refers to the image processing task of identifying portions of an image that correspond to a given object. This task has applications in areas such as image search and retrieval, image synthesis, image editing, and human-computer interactions.

The object segmentation task can also be applied to videos, but conventional object segmentation methods produce inaccurate and temporally inconsistent results in the video context. Therefore, there is a need in the art for improved systems and methods for video object segmentation.

SUMMARY

A method, apparatus, and non-transitory computer readable medium for video object segmentation are described. Embodiments of the method, apparatus, and non-transitory computer readable medium may include receiving a video and a referral expression, wherein the video comprises a first image frame and a second image frame; generating image mask information comprising a first image mask generated based on the referral expression and the first image frame, and a second image mask generated based on the referral expression, the second image frame and the first image mask; and generating video object segmentation information indicating the presence of an object corresponding to the referral expression in the video, wherein the video object segmentation information includes the first image mask overlaid on the first image frame and the second image mask overlaid on the second image frame.

In some examples, generating the first image mask and the second image mask encoding the first image frame using the image encoder; encoding the referral expression using the language encoder; generating the first image mask based at least in part on the encoded first image frame and the encoded referral expression; storing the first image mask and the first image frame in a memory image storage; encoding the second image frame using the image encoder; encoding the stored first image frame together with the stored first image mask using the memory encoder to produce an encoded memory frame; and generating the second image mask based on the encoded second image frame, the encoded memory frame, and the encoded referral expression.

A method, apparatus, and non-transitory computer readable medium for training an artificial neural network (ANN) video object segmentation are described. Embodiments of the method, apparatus, and non-transitory computer readable medium may identify a training set comprising a plurality of videos, wherein at least one image frame from each of the plurality of videos is associated with a referral expression and image mask information corresponding to the referral expression, generate at least one image mask for the at least one image frame from each of the plurality of videos, wherein the at least one image mask is generated based on the referral expression, the at least one frame, at least one memory image frame and at least one memory image mask, compute a loss function based on a comparison of the image mask information and the at least one image mask, and update the ANN based on the loss function.

An apparatus and production method for video object segmentation are described. Embodiments of the apparatus and method may include providing an image encoder configured to generate an image feature vector based on an image frame, a language encoder configured to produce an expression embedding based on a referral expression, a cross-attention module configured to generate a cross-attention vector based on the image frame and the expression embedding, a memory encoder configured to generate a memory feature vector based on a memory image frame and a memory image mask, a memory attention module configured to generate a memory attention vector based on the memory feature vector and a first output of the image encoder, and a decoder configured to generate an image mask based on the image feature vector, the cross-attention vector, and the memory attention vector.

DETAILED DESCRIPTION

Figure 1:
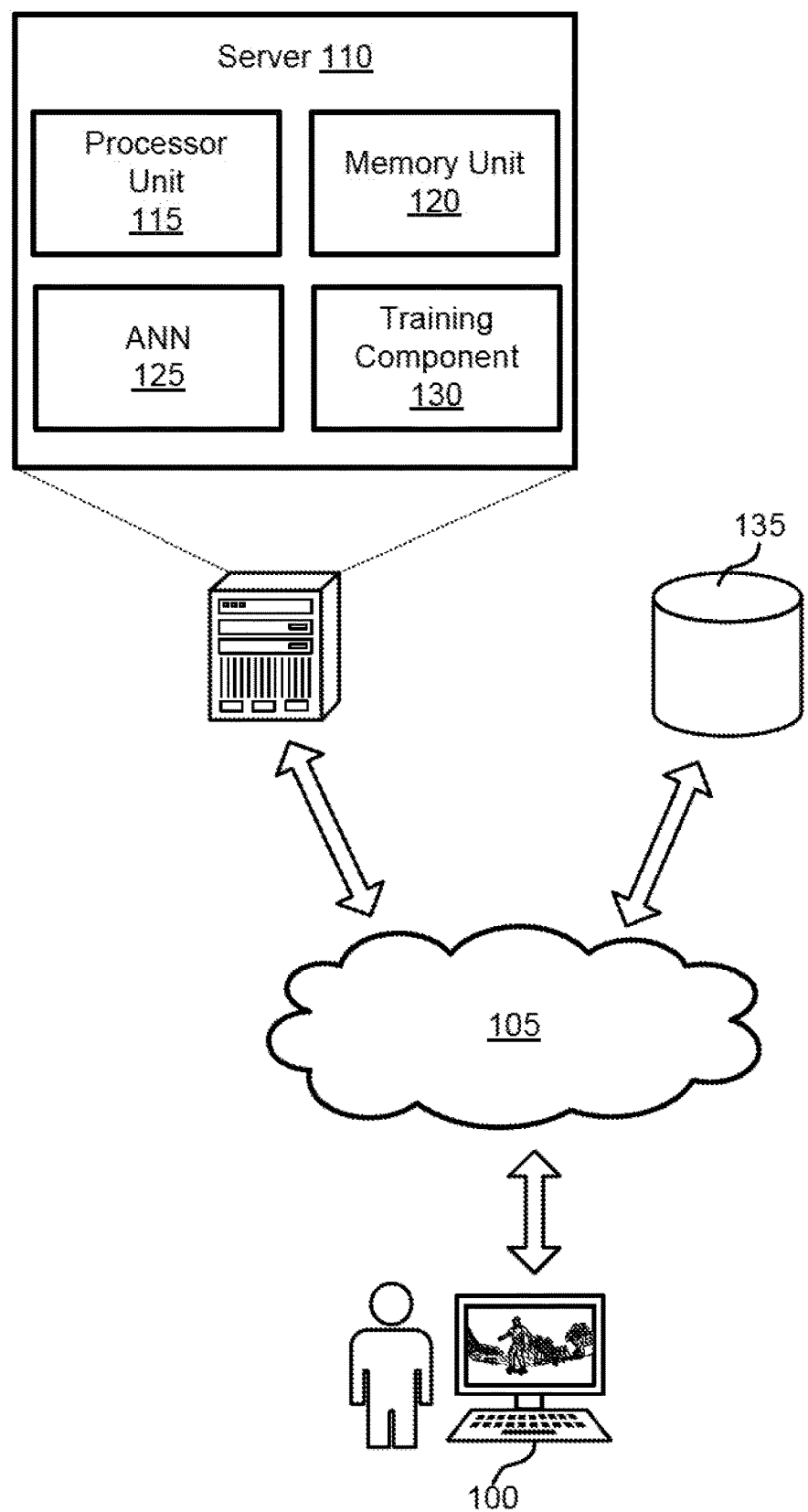
FIG. 1 shows an example of a system for video object segmentation according to aspects of the present disclosure.

The present disclosure relates to systems and methods for referring video object segmentation. According to some embodiments, video object segmentation is performed using a neural network that takes a language expression, a current video frame, and one or more memory frames as input. Object segmentation refers to the image processing task of identifying regions of pixels of an image associated with an object. In a video object segmentation task, one or more objects are identified and tracked through multiple frames of a video. For example, an image mask can identify which pixels in the image correspond to a given object. Video object segmentation can be useful for applications such as video analysis and editing. Referring video object segmentation refers to the task of identifying an object across multiple frames of a video based on a natural language expression.

Video object segmentation may be achieved using either unsupervised or semi-supervised methods. Unsupervised methods may be used to estimate object masks for noticeable objects, moving objects, or objects that belong to predefined classes. However, unsupervised methods may not be suitable for video editing tasks that include segmenting an arbitrary object in a flexible manner. For example, conventional unsupervised methods may not allow an arbitrary object in a video to be identified and tracked consistently. For example, in the video shown in FIG. 3, conventional methods may properly identify the man riding the skateboard for some frames, but not in other frames.

As an alternative to unsupervised learning, semi-supervised methods may propagate a ground truth object mask provided for one frame to other frames in the video. However, conventional semi-supervised learning can be tedious and time consuming because they depend on manual identification of objects in at least one frame. User intervention can be used during inference to address these issues, but a network that depends on manual intervention may not be as efficient as a network that performs the task independently.

Another approach to video object segmentation utilizes a language expression (i.e., the referring expression) to identify objects in a video. As a baseline for this referring video segmentation task, referring image segmentation techniques are applied to each input frame independently. However, this method does not take temporal coherency of videos into consideration, and may result in inconsistent object mask predictions across frames.

According to yet another example of video object segmentation, referring image segmentation is followed by semi-supervised video object segmentation. An object mask is initialized at a certain frame (i.e., the anchor frame), and this mask is propagated to subsequent frames. In some cases, propagating masks from an anchor frame may result in over-fitting tied to the anchor frame view (e.g., when images experience occlusions or background clutter). One way to address over-fitting is to generate a set of mask proposals and choose the most temporally-consistent set of candidates. However, post-processing selection may not effectively exploit temporal coherence.

Therefore, the present disclosure describes a unified referring video object segmentation network. Embodiments of the present disclosure include an end-to-end framework for referring video object segmentation which performs referring image segmentation and semi-supervised video object segmentation jointly in a single model. At least one embodiment of the present disclosure includes two attention modules—a memory attention module and a cross-modal attention module. Memory attention may be used to obtain temporal consistent results. Cross-modal attention may avoid drift (e.g., inaccuracy from the accumulation of small errors that results in a gradual shift away from the target object).

Accordingly, embodiments of the present disclosure enable object segmentation of a video with increased accuracy and temporal coherence. Additionally, objects can be arbitrarily selected using a natural language referring expression. Embodiments of the present disclosure enable efficient mobile video editing, image search, and are well suited for augmented reality applications.

An example of the annotation information generated by a video object segmentation mask is described with reference to FIG. 3. There, several frames of a video showing a man riding a skateboard are shown, where the man is highlighted according to an image mask (i.e., based on a referring expression). Embodiments of the present disclosure utilize a large-scale dataset for referring video object segmentation. According to one embodiment, the dataset used for training and evaluating includes 27,000+ referring expressions for 3,900+ videos such as the one shown in FIG. 3. The efficiency of the video object segmentation network may be evaluated using benchmark datasets including the described large-scale referring video object segmentation dataset.

System Overview

FIG. 1 shows an example of a system for video object segmentation according to aspects of the present disclosure. The example shown includes user terminal 100, communications network 105, server 110, and database 135. Server 110 may include processor unit 115, memory unit 120, ANN 125, and training component 130.

The system described in FIG. 1 may include a unified referring video object segmentation network that can exploit both referring segmentation and video object segmentation in a single model. For example, in one embodiment the server 110 may include the unified referring video object segmentation network. Thus, a user operating user terminal 100 may provide a video and a referring expression via communications network 105. In some cases, the video is stored in a video collection on database 135.

The server 110 may receive the video and the referring expression and provide annotation information (i.e., an object segmentation mask) to the user in response. In another example, the unified referring video object segmentation network may be located within the user terminal 100. Thus, the user terminal 100 may include the functions and components described herein as being located within the server 110.

According to one embodiment, two attention modules—a cross-modal attention module and a memory attention module—work jointly to obtain an exact target object specified by natural language expressions while maintaining temporal consistent segmentation results among frames. One embodiment of the present disclosure utilizes a large-scale video object segmentation dataset. The described video object segmentation network framework can achieve performance gain running on such large-scale datasets including existing benchmark datasets.

A processor unit 115 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions. In some examples, the processor may comprise a system-on-a-chip.

A memory unit 120 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Artificial neural network (ANN) 125 may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

A recurrent neural network (RNN) is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

A long short term memory (LSTM) is a form of RNN that includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

A ResNet is an example of a neural network architecture that may be used (e.g., as an image encoder) to addresses issues associated with training deep neural networks. It operates by including identity shortcut connections that skip one or more layers of the network. In a ResNet, stacking additional layers doesn't degrade performance or introduce training errors because skipping layers avoids the vanishing gradient problem of deep networks. In other words, the training gradient can follow "shortcuts" through the deep network.

Embodiments of the present disclosure also utilize one or more attention modules. An attention mechanism is a method of placing differing levels of importance on different elements of an input. Calculating attention may involve three basic steps. First, compute the similarity between query and key vectors obtained from the input to generate attention weights. Similarity functions may include dot product, splice, detector, etc. Next, use a softmax function to normalize the weights. Finally, weigh the attention weights in together with the corresponding values.

According to one embodiment, ANN 125 receives a referral expression and a video including a set of image frames. ANN 125 may then generate a first image mask based on the referral expression and a first image frame of the set of image frames. The term image mask refers to annotation information for an image identifying which pixels correspond to an object (i.e., the object identified by the referring expression).

ANN 125 may then generate a second image mask based on the referral expression, the first image frame, the first image mask, and a second image frame of the set of image frames. ANN 125 may then generate annotation information for the video including the first image mask overlaid on the first image frame and the second image mask overlaid on the second image frame. ANN 125 may be an example of, or include aspects of, the corresponding element or elements described with reference to FIG. 4.

Training component 130 may identify a training set including a set of videos, where at least one image frame from each of the set of videos is associated with a referral expression and image mask information corresponding to the referral expression. Training component 130 may also compute a loss function based on a comparison of the image mask information and the at least one image mask. Training component 130 may then update the ANN 125 based on the loss function.

Figure 2:
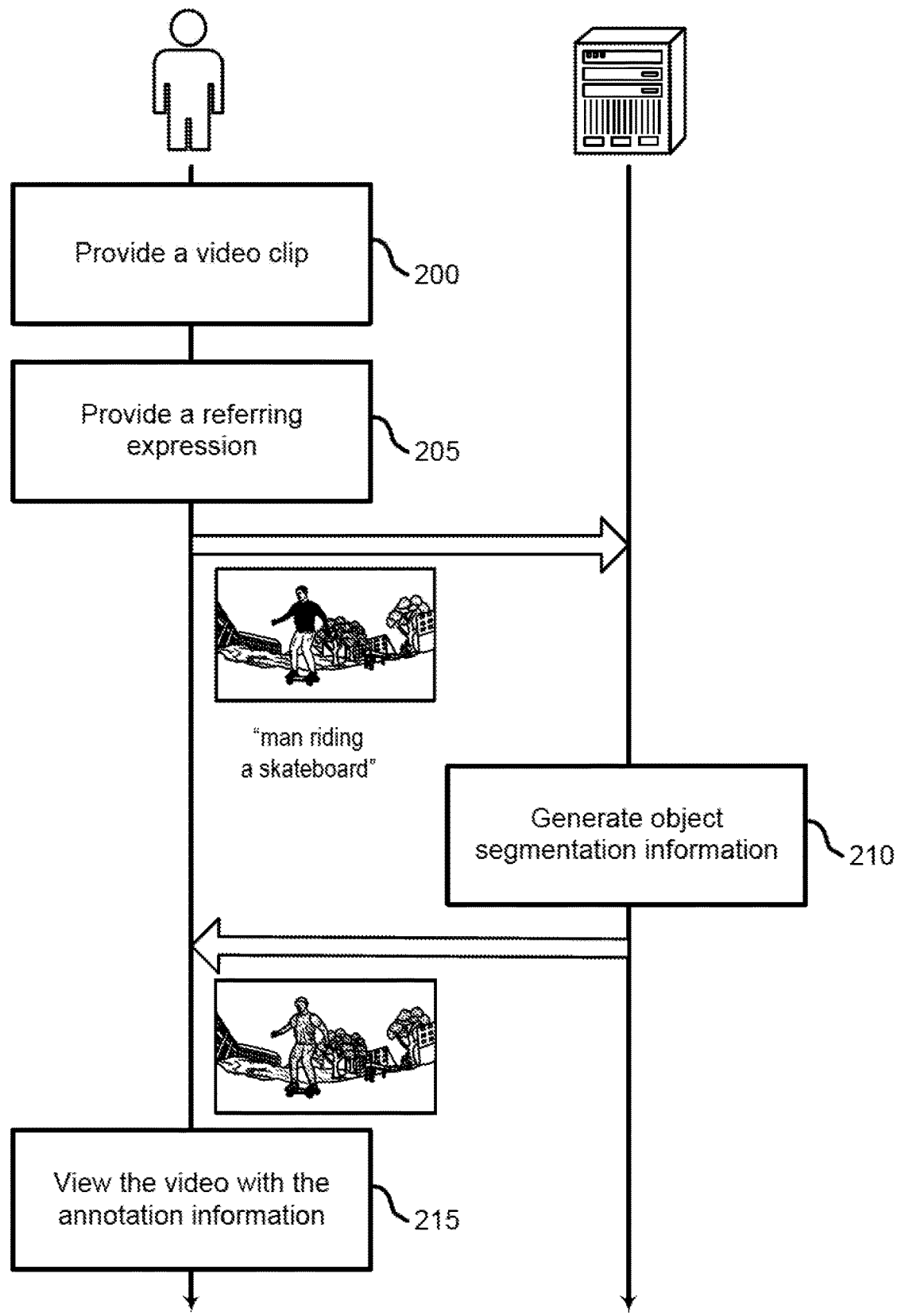
FIG. 2 shows an example of a process for video object segmentation according to aspects of the present disclosure.

FIG. 2 shows an example of a process for video object segmentation according to aspects of the present disclosure. In some examples, these operations may be performed by a system (e.g., the system described above with reference to FIG. 1) including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 200, the user provides a video clip. At operation 205, the user provides a referring expression. For example, the user may provide a referring expression and a video for an application such as a video editing application, an image search application, or an augmented reality application. In some cases, the video is provided from a video database as described above with reference to FIG. 1. In some embodiments, the video may be selected based on the referring expression (e.g., the referring expression may also be a search query).

As illustrated in FIG. 2, the user provides a video of a man riding a skateboard, along with the referring expression "man riding a skateboard." The terms "referring expression" and "referral expression" refer to the natural language expression that is used to identify an object in an image or a video. Thus, "man riding a skateboard" is an example of a referring expression. In some cases, the referring expression may include an action, and in other cases it may be a single term, such as "skateboard" that may be identified and tracked across multiple frames of a video.

At operation 210, a video object segmentation system generates object segmentation information for the video clip. For example, a unified referring video object segmentation network as described above with reference to FIG. 1 may generate an image mask for frames of the video that corresponds to an object identified by the referring expression.

In the illustrated example, the system provides the result of a video in which the man riding the skateboard is highlighted or otherwise marked according the image mask. At operation 215, the user views the video with the annotation information.

Video Object Segmentation

Figure 3:
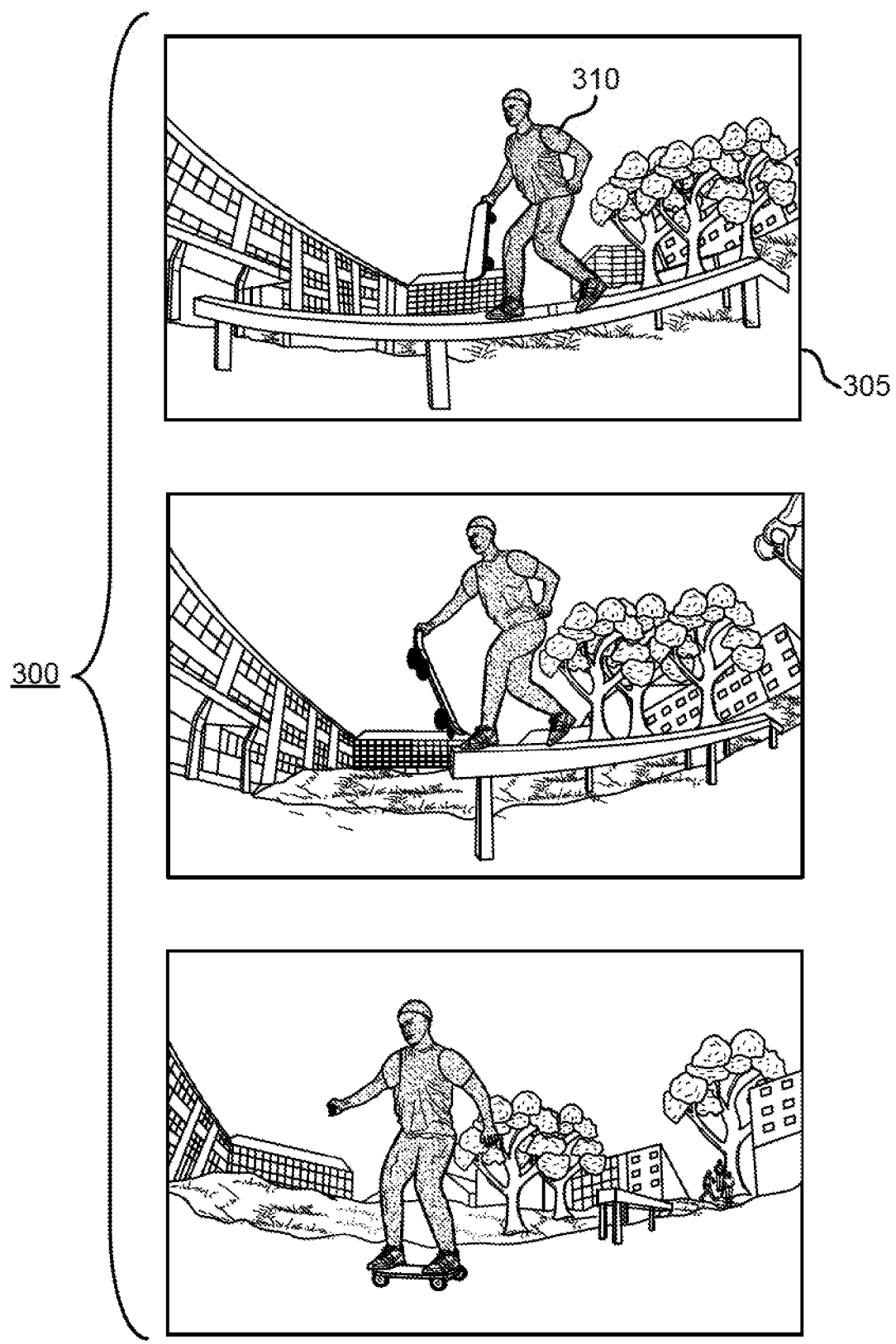
FIG. 3 shows an example of a video with object segmentation annotation information according to aspects of the present disclosure.

FIG. 3 shows an example of a video 300 with object segmentation annotation information 310 according to aspects of the present disclosure. Video 300 includes multiple frames 305. Each of the frames 305 includes annotation information 310.

In the example illustrated by FIG. 3, the video 300 shows a man riding a skateboard. Each of the frames 305 shows the man in a different position according to the passage of time in the video 300. The annotation information 310 includes an image mask for each frame, where the image mask indicates which pixels of the image correspond to a referring expression (e.g., "a man riding a skateboard").

Generally, a referring image segmentation task produces a segmentation mask of an object in the image given a natural language expression. Some examples of referring image segmentation networks exploit a long short term memory (LSTM) and convolutional neural network (CNN) to extract and concatenate visual and linguistic features. In some cases, sequential interactions between multi-modal features may be captured by introducing convolutional LSTM. Dynamic convolution filters from lingual features may further improve cross-modal interactions.

In some cases, feature pyramid structures may be used to take advantage of multi-scale semantics for referring image segmentation. In one example, a modular attention network decomposes multi-modal reasoning into a subject, object and relationship modules and exploits attention to focus on relevant modules. In some cases, a referring object segmentation network may also include attention-guided erasing approach to discover complementary visual-lingual correspondence.

In some cases, cross-modal attention features may be used to capture long-range correlations between visual and linguistic modalities in order to bridge attentions between language and vision. The term "cross-modal attention" refers to a process of a neural network that generates a feature representation combining information from both an image frame and a referring expression.

Semi-supervised video object segmentation tracks an object mask in an entire video given a ground truth object mask for the first frame. Semi-supervised video object segmentation may be achieved using online learning or offline learning. Most of semi-supervised approaches rely on online learning, which fine-tunes networks using the first-frame ground truth during test. For example, one-shot video object segmentation approach incorporates a pre-trained fully-convolutional neural network and online learning. In another example, optical flow is exploited to propagate a segmentation mask to the next frame. In another example, reinforcement learning is applied to estimate a region of interest for segmentation.

Online learning is often computationally complex. Thus, offline learning may be used to shorten runtime. For example, a meta neural network may manipulate intermediate layers of the segmentation network given the target object. In another example, a Siamese encoder-decoder network may exploit visual guidance from the first frame and a previous frame. In yet another example, a network learns a semantic embedding and applies global matching to the first frame and local matching to previous frames.

In some cases, a space-time memory network may perform non-local matching between previous frames and current frames. A space-time memory network may improve performance over online learning. Accordingly, embodiments of the present disclosure incorporate a nonlocal module of a space-time memory network as well as a memory attention module that can exploit temporal coherence. The term "memory attention" refers to a process of a neural network that identifies relevant information from one or more previously stored frames and image masks to aid in finding a temporally coherent image mask for a current frame.

The intersection of language and video understanding has applications in visual tracking, action segmentation, and video question answering. For example, a natural language specification may be the basis for tracking target object in a video. In another example, a fully-convolutional model may be used to segment an actor and the actor's action in each frame of a video as specified by a language query. Unlike some benchmark datasets which have limited number of predefined action classes, a large-scale dataset utilized for certain embodiments is not limited to certain classes and may contain much more diverse situations.

Embodiments of the present disclosure may be trained and evaluated using various referring segmentation datasets for videos. For example, A2D and J-HMDB datasets may be extended with textual sentences. These datasets focus on describing "actors" and "actions" appearing in videos. Hence, the instance annotations are limited to a few object categories corresponding to dominant "actors" performing a noticeable "action".

To facilitate referring video object segmentation, one embodiment of the present disclosure includes generation of a large-scale video object segmentation dataset with referring expressions. In one example, the large-scale dataset may include 4519 high-resolution videos with 94 common object categories. Each video has pixel-level instance annotations at every 5 frames in a 30-fps frame rate, and its duration is around 3 to 6 seconds.

Embodiments of the present disclosure may employ a crowdsourcing solution to annotate a training and a validation set of a dataset. In one example, around 50 turkers may be selected after validation test to ensure the quality of the annotations. Each turker contains a pair of videos, original video and the mask-overlaid video highlighting the target object, and may be asked to provide a discriminative and clear sentence within 20 words that describes the target object. Two kinds of annotations are then collected: annotations describing the highlighted object (1) using the entire video (full-video expression), and (2) using only the first frame of each video (first-frame expression). After initial annotation, verification and cleaning jobs are executed for all annotations. Objects are dropped if an object cannot be localized using language expressions only.

According to one embodiment, a large scale dataset used for training and evaluation covers 6388 unique objects in 3471 videos with 12913 expressions in a training set and 1063 unique objects in 507 videos with 2096 expressions in a validation set. Each video has 3.8 language expressions on average and each expression has 10.0 words on average.

According to another embodiment, a large scale dataset provides annotation for 6006 unique objects in 3412 videos with 10897 expressions in a training set and 1030 unique objects in 507 videos with 1993 expressions in a validation set. The number of annotated objects may be lower than that of a full-video expression. Because using only the first frame makes annotation more difficult and ambiguous, additional annotations of first-frame expressions may be dropped at verification stage. In this example, each video has 3.2 language expressions on average and each expression has 7.5 words on average.

Network Architecture

Figure 4:
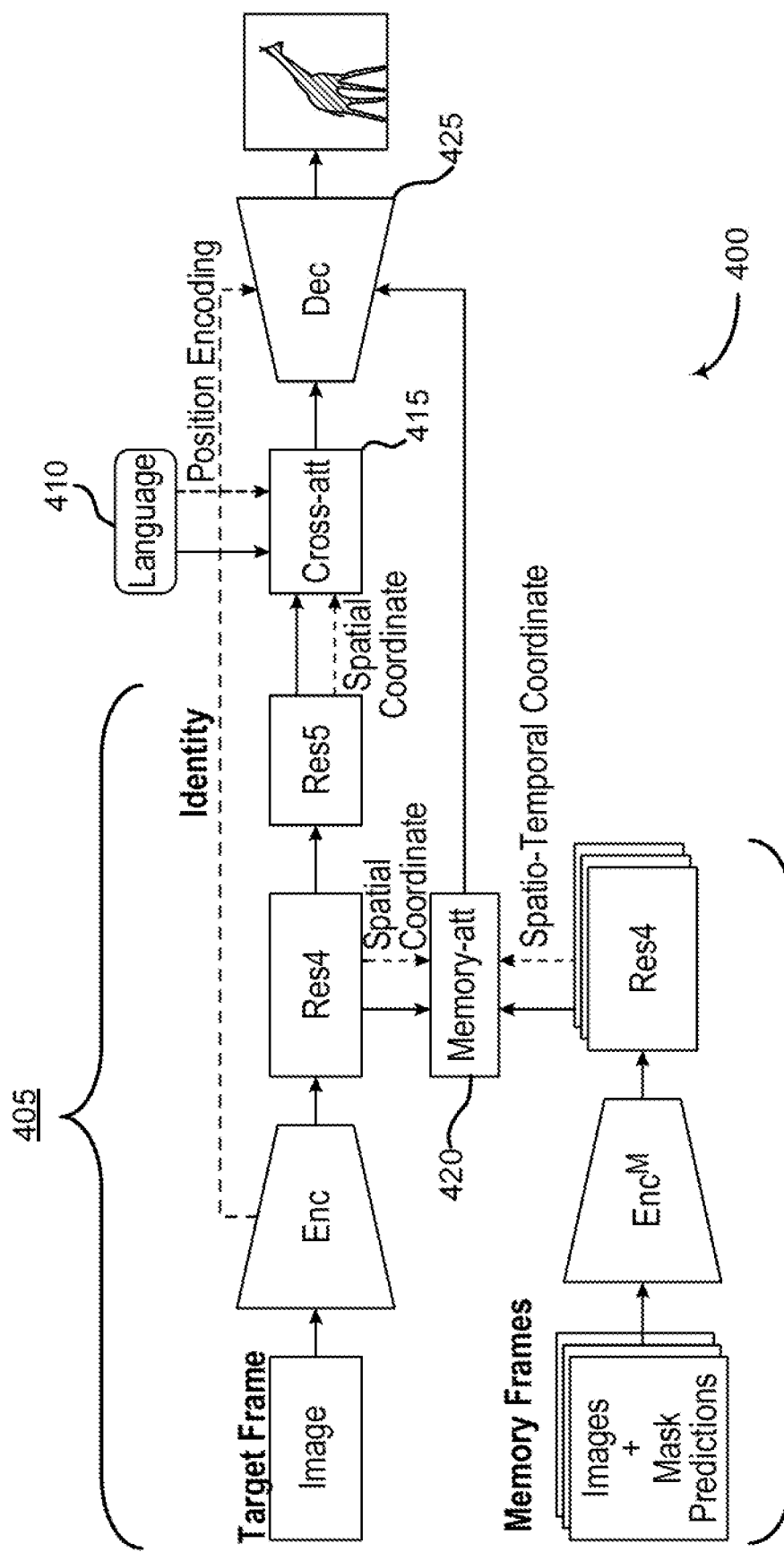
FIG. 4 shows an example of an artificial neural network (ANN) for video object segmentation according to aspects of the present disclosure.

FIG. 4 shows an example of an ANN 400 for video object segmentation according to aspects of the present disclosure. ANN 400 may be an example of, or include aspects of, the corresponding element or elements described with reference to FIG. 1. ANN 400 may include image encoder 405 (i.e., a current frame encoder), memory encoder 406, language encoder 410, cross-attention module 415, memory attention module 420, and decoder 425. Here, the term "encoder" refers to a neural network component that takes various inputs (e.g., a natural language query, an image, or an image mask) and outputs a vector or matrix of numbers (i.e., a feature vector). By contrast, a "decoder" refers to a network component that takes a feature vector and outputs an image mask.

The present disclosure describes a unified network framework that may perform referring image segmentation and video object segmentation jointly. Given a video and a referring expression, an object mask is estimated in an input frame using both language referring expressions and mask predictions from previous frames. The video object segmentation network framework iteratively processes video frames until mask predictions in the entire video frames converge. FIG. 4 shows the overall architecture of an exemplary embodiment of the video object segmentation network framework.

According to some embodiments, the function of the network may be described with reference to a data model as follows. Let $x \in \mathbb{R}^{H \times W \times 3}$ and $y \in \mathbb{R}^{H \times W}$ denote an RGB frame and a binary segmentation mask, respectively. Given a video with N frames, i.e., $\{x_n | n \in [1, \ldots, N]\}$, and a language query Q, the objective of referring video object segmentation is to predict binary segmentation masks for all frames, i.e., $\{y_n | n \in [1, \ldots, N]\}$, corresponding to the query Q. The mask y may be estimated for each frame independently, i.e., $p(y_n | x_n, Q)$ (n=1, ..., N).

The above model applies image-based solutions for referring object segmentation. However, by itself it may not exploit valuable information and temporal coherence among frames. To address this issue, embodiments of the present disclosure cast the referring video object segmentation task as a joint task of referring object segmentation in an image and mask propagation in a video. The objective function is $p(y_n | x_1^n, y_1^{n-1}, Q)$, where $x_1^n = \{x_1, x_2, \ldots, x_n\}$ and $y_n^{n-1} = \{y_1, y_2, \ldots, y_{n-1}\}$, respectively.

Image Encoding

Embodiments of the present disclosure extract visual features for an input frame. The visual feature contains 8-dimensional spatial coordinates, which have spatial position information. Let $F \in \mathbb{R}^{H \times W \times C_f}$ and $f_p \in \mathbb{R}^{C_f}$ denote a visual feature map and a sliced visual feature at a certain spatial location p on F, where $p \in \{1, 2, \ldots, H \times W\}$. Spatial coordinates are concatenated to the visual features $f_p$ to get location-aware visual features $\tilde{f}_p$ as follows.

$$\tilde{f}_p = [f_p; s_p] \in \mathbb{R}^{C_f + 8} \quad (1)$$

where $s_p$ is an 8-dimensional spatial feature. For each spatial-temporal position (h, w), $$s_p = \left[ h_{min}, h_{avg}, h_{max}, w_{min}, w_{avg}, w_{max}, \frac{1}{H}, \frac{1}{W} \right].$$

Accordingly, image encoder 405 generates an image feature vector based on an image frame. In some examples, the image encoder 405 includes a first intermediate stage configured to provide first feature information to the decoder 425 and a second intermediate stage configured to provide second feature information to the decoder 425.

Language Encoding

Embodiments of the present disclosure also extract language features from a referring expression. Given a referring expression, each word in the referral expression may be encoded to a one-hot vector and projected onto an embedding space with $C_e$ dimensions using a linear layer. To model a sequential nature of language expressions while maintaining the semantics of individual words, embodiments of the present disclosure add positional encoding at each word position. Let $w_l \in \mathbb{R}^{C_e}$ and $p_l \in \mathbb{R}^{C_e}$ denote embeddings for l-th word and a position of the expression, respectively. Lingual feature is obtained by the summation of the two embeddings, i.e., $e_l = w_l + p_l \in \mathbb{R}^{C_e}$.

Accordingly, language encoder 410 generates an expression embedding for a referral expression. In some cases, the expression embedding includes a semantic information and position information for each word of the referral expression, and the first image mask and the second image mask are based on the expression embedding.

Cross-Modal Attention

Embodiments of the present disclosure combine the visual features and the language features. A joint cross-modal feature representation may be produced by concatenating both visual and lingual features. Self-attention is applied to each feature independently before producing a joint feature to effectively capture essential information between both modalities (i.e., visual and lingual). Each self-attention module maps each feature to a $C_a$-dimensional space for both modalities as follows:

$$\hat{f}_p = SA^v(f_p) \in \mathbb{R}^{C_a}, \hat{e}_l = SA^l(e_l) \in \mathbb{R}^{C_a} \quad (2)$$

where $SA^*(\cdot)$ ($* \in \{v, l\}$) denotes a self-attention module for either visual or lingual features. Then a joint cross-modal feature at each spatial position p and each word position l is $$c_{pl} = [\hat{f}_p; \hat{e}_l] \in \mathbb{R}^{C_a + C_a} \quad (3)$$

The described video object segmentation network collects all cross-model features $c_{pl}$ and form a cross-modal feature map as $C = \{c_{pl} | \forall p, \forall l\} \in \mathbb{R}^{H \times W \times L \times (C_a + C_a)}$.

Self-attention is conducted on the cross-modal feature C. A set of (key, query, value) triplets, denoted by k, q, v, can be generated using 2D convolutions as follows:

$$k = Conv_{key}(C) \in \mathbb{R}^{L \times H \times W \times C_a} \quad (4)$$

$$q = Conv_{query}(C) \in \mathbb{R}^{L \times H \times W \times C_a} \quad (5)$$

$$V = Conv_{value}(C) \in \mathbb{R}^{L \times H \times W \times C_a} \quad (6)$$

Cross-modal attentive features may be obtained as follows:

$$\hat{c}_{pl} = c_{pl} + \sum_{\forall p', l'} f(k_{p', l'}, q_{pl}) v_{p', l'} \quad (7)$$

where $f(x, y) = Softmax(x \cdot y)$ and $\cdot$ denotes a dot-product operator. f(x, y) computes the correlation between all combinations of pixels and words. Self-attentive features are averaged over words and the video object segmentation network framework obtains a final cross-modal feature as $$\hat{c}_p = \frac{1}{L}\sum_l c_{pl} \text{ and } \hat{C} = \{\hat{c}_p \mid \forall p\} \in \mathbb{R}^{H \times W \times C_b}.$$

Accordingly, cross-attention module 415 generates a cross-attention vector based on an image frame and an expression embedding. For example, cross-attention module 415 may combine information from the first image frame and the referral expression to produce a cross-modal feature vector. Then, a cross-attention module 415 may apply a self-attention process to the cross-modal feature vector to produce a cross-attention vector. The first image mask may be based on the cross-attention vector. In some examples, information from the first image to the cross-attention module 415 is drawn from a second intermediate stage of an image encoder 405. In some examples, the cross-attention vector is fed to a first refinement stage of a decoder 425. Cross-attention module 415 may be an example of, or include aspects of, the corresponding element or elements described with reference to FIG. 5.

Figure 5:
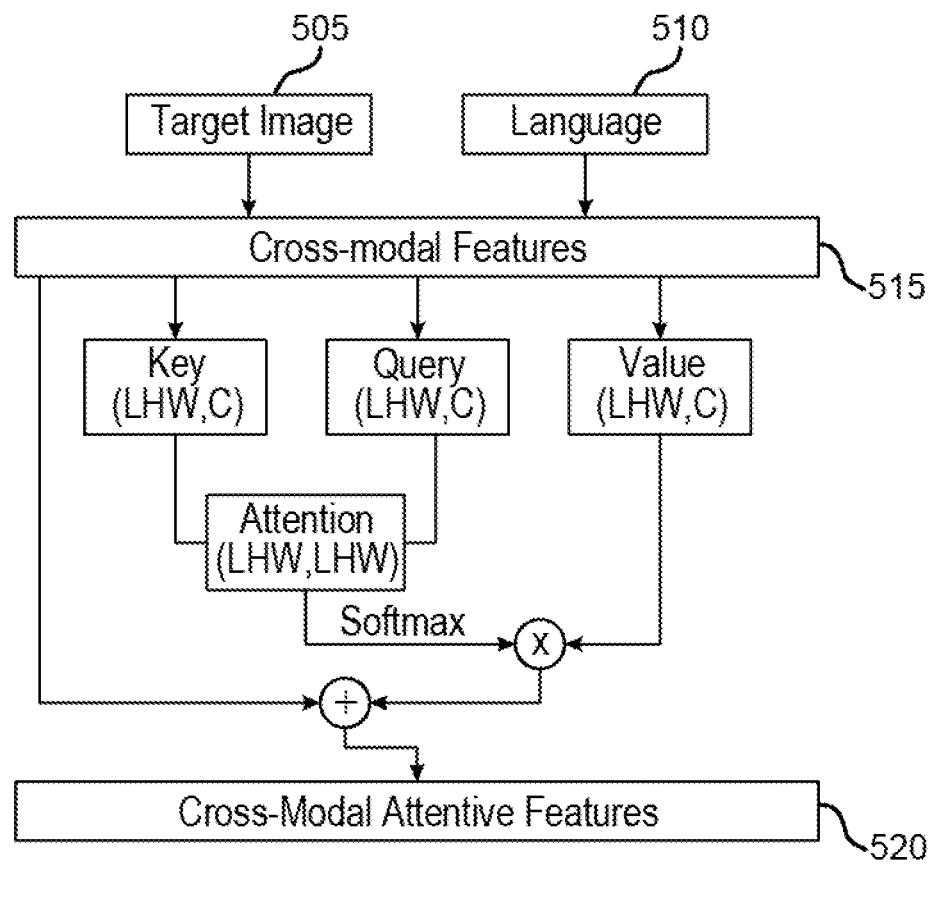
FIG. 5 shows an example of a cross-attention module according to aspects of the present disclosure.

FIG. 5 shows an example of a cross-attention module according to aspects of the present disclosure. Cross-attention module 500 may be an example of, or include aspects of, the corresponding element or elements described with reference to FIG. 4. Cross-attention module 500 may include target image 505, language expression 510, cross-modal features 515, and cross-modal attentive features 520.

Embodiments of the present disclosure combine the visual features and the language features. Cross-modal features 515 may be produced by concatenating both visual and language expression 510. Self-attention is applied to each feature independently before producing a joint feature to effectively capture essential information between both modalities (i.e., visual and lingual). Each self-attention module maps each feature to a multi-dimensional space for both modalities.

A joint cross-modal feature at each spatial position and each word position is identified. The cross-attention module 500 collects all cross-model features and forms cross-modal features 515. Self-attention is conducted on the cross-modal features 515. A set of (key, query, value) triplets can then be generated using 2D convolutions. Attentive features 520 may then be generated based on the key, query and value triplets. Attentive features may be averaged over words and to obtain a final Cross-modal attentive features 520.

Memory Attention

Embodiments of the present disclosure employ a memory attention module 420 to leverage information from previous mask predictions in a video. The memory attention module 420 computes the correlation between each of current visual features and previous mask-encoded visual features, and retrieves relevant information from previous frames and mask predictions. Memory encoder 406 may process one or more previous frames. For example, memory encoder 406 may take 4-channel inputs by concatenating RGB frames and mask predictions along a channel axis. Current and previous frames are referred to as target and memory frames, respectively.

One embodiment of the present disclosure introduces 12-dimension spatial-temporal coordinates which provide spatial-temporal information in visual features. A first 3-dimension encodes normalized temporal positions, a subsequent 6-dimension encodes normalized vertical and horizontal positions, and a last 3-dimension encodes the normalized time length, height and width information of an entire video for each spatial-temporal position (t, h, w), i.e.

$$\tilde{s}_{tp} = \left[t_{min}, t_{avg}, t_{max}, h_{min}, h_{avg}, h_{max}, w_{min}, w_{avg}, w_{max}, \frac{1}{T}, \frac{1}{H}, \frac{1}{W}\right].$$

Let T denotes the number of memory frames. For target frame and T memory frames, key and value embeddings are obtained as follows.

$$\bar{F} = \{[f_p; s_p] \mid \forall p\} \in \mathbb{R}^{H \times W \times (C_f + 8)} \quad (8)$$

$$k = \text{Conv}_{key}(\bar{F}) \in \mathbb{R}^{H \times W \times C_b} \quad (9)$$

$$v = \text{Conv}_{value}(\bar{F}) \in \mathbb{R}^{H \times W \times C_b} \quad (10)$$

$$\bar{F}^M = \{[f_{tp}^M; \tilde{s}_{tp}] \mid \forall t, \forall p\} \in \mathbb{R}^{T \times H \times W \times (C_f + 12)} \quad (11)$$

$$k^M = \text{Conv}_{key}^M(\bar{F}^M) \in \mathbb{R}^{T \times H \times W \times C_b} \quad (12)$$

$$v^M = \text{Conv}_{key}^M(\bar{F}^M) \in \mathbb{R}^{T \times H \times W \times C_b} \quad (13)$$

where f and p denote target and memory visual features, and s and š denotes spatial and spatial-temporal coordinates, respectively.

Then, memory-attentive features $\hat{m}_p$ at the spatial location p is obtained as $$\hat{m}_p = m_p + v_p + \sum_{\forall t', p'} f(k_p, k_{t',p'}^M) v_{t',p'}^M \quad (14)$$

and $\hat{M} = \{\hat{m}_p \mid \forall p\} \in \mathbb{R}^{H \times W \times C_b}$. The present disclosure combines the output of a memory attention module with an original feature to preserve a residual connection. FIG. 4(b) shows the detailed illustration of the memory attention module. The memory attention module applies fourth stage features (Res4) for both target and memory frames, because it uses more descriptive features to compute the correlation among local regions of the frames. Cross-modal attention module may use fifth stage features (Res5) to exploit more semantic information.

Accordingly, memory attention module 420 generates a memory attention vector based on a memory feature vector and a first output of the image encoder 405. For example, memory encoder 406 may combine information from a first image frame and a first image mask to produce a memory feature vector. Memory attention module 420 may then apply an attention process to the memory feature vector and information from the second image frame to produce a memory attention vector. The second image mask may be based on the memory attention vector. In some examples, the information from the second image frame is drawn from a first intermediate stage of an image encoder 405. In some examples, the memory attention vector is fed to a second refinement stage of a decoder 425. Memory attention module 420 may be an example of, or include aspects of, the corresponding element or elements described with reference to FIG. 6.

Figure 6:
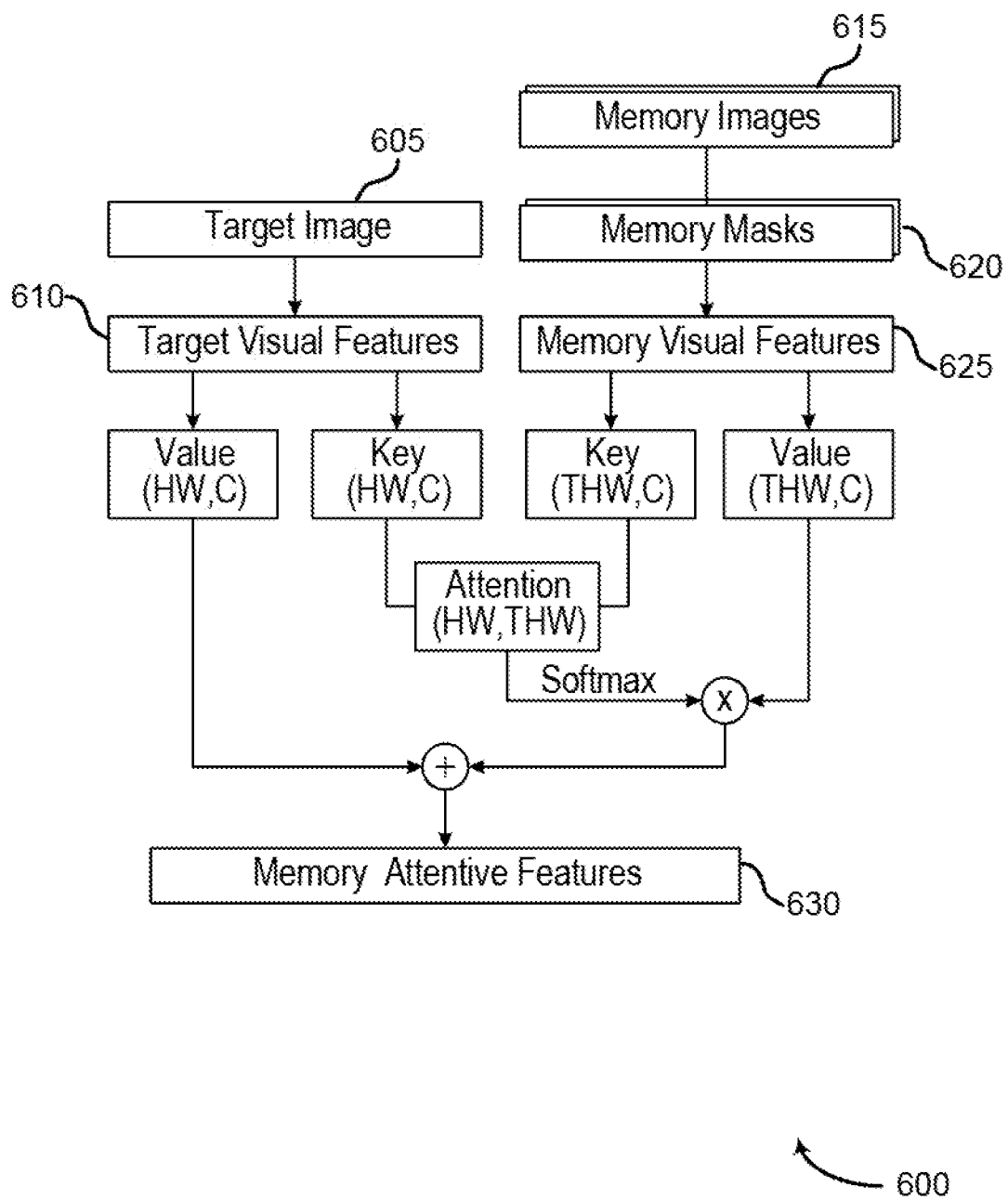
FIG. 6 shows an example of a memory attention module according to aspects of the present disclosure.

FIG. 6 shows an example of a memory attention module 600 according to aspects of the present disclosure. Memory attention module 600 may be an example of, or include aspects of, the corresponding element or elements described with reference to FIG. 4. Memory attention module 600 may include target image 605, target visual features 610, memory images 615, memory masks 620, memory visual features 625, and memory attentive features 630.

Embodiments of the present disclosure employ a memory attention module 600 to leverage information from previous mask predictions in a video. The memory attention module 600 may compute the correlation between each of target visual features 610 and memory visual features 625, and retrieves relevant information from memory images 615 and memory masks 620. In some cases, a memory encoder may process the memory images 615 and memory masks 620.

Key and value embeddings are obtained for target visual features 610 and memory visual features 625. Then, memory attentive features 630 at the spatial location are obtained. Thus, the present disclosure combines the output of a memory attention module with an original feature to preserve a residual connection. The memory attention module 600 may apply intermediate stage features for both target image 605 and memory images 615. In some cases, memory attention module 600 may use more descriptive features to compute the correlation among local regions of the frames.

Decoding

Referring again to FIG. 4, embodiments of the present disclosure employ a hierarchical structure in a top-down fashion for a decoder 425 to combine three types of different semantic features—an cross-modal attentive feature map $\hat{C}$, an memory attentive feature map $\hat{M}$, and an original visual feature map $F_l$ from different levels $l \in \{2,3,4,5\}$. The decoder 425 may include multiple refinement modules corresponding to some level l to combine features in a progressive manner. Each refinement module takes two types of input-output of previous refinement module and visual feature at the corresponding scale $F_l$. In addition, a first and a second refinement module take cross-attentive features $\hat{C}$ and memory-attentive features $\hat{M}$, respectively. For each module, all features may be passed to ResBlocks independently, and summed to fuse multi-modal or temporal information effectively. The output from the previous module is up-sampled by a factor of 2 to match the size of feature map to the next level.

To fuse multi-scale semantic information, one embodiment of the present disclosure adopts a feature pyramid structure that contains a non-local module in the middle to strengthen the feature semantics. In addition, 8-dimensional spatial coordinate is concatenated in a feature extraction to preserve spatial locality of the features. In one example, the final output of a decoder may estimate the mask in ¼ scale of an input image.

Accordingly, decoder 425 generates an image mask based on the image feature vector, the cross-attention vector, and the memory attention vector. In some cases, multiple image masks (each corresponding to an image frame) are generated based on the referral expression, a current image frame, and memory information include previous image frames and the corresponding image masks. Annotation information for a video may include image masks overlaid on the corresponding image frames. In some examples, the decoder 425 includes a first refinement stage configured to receive the cross-attention vector and a second refinement stage configured to receive the memory feature vector.

Inference

Figure 7:
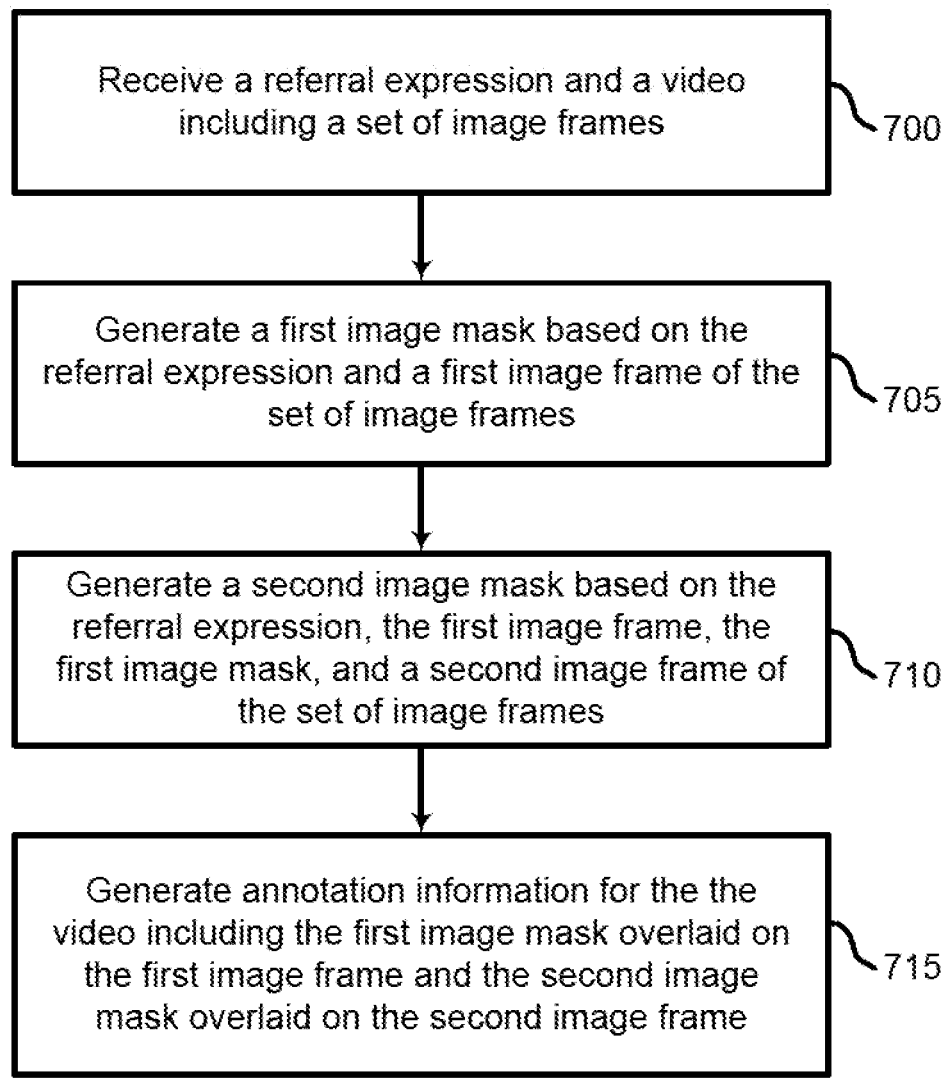
FIGS. 7 through 8 show examples of a process for video object segmentation according to aspects of the present disclosure.

FIG. 7 shows an example of a process for video object segmentation according to aspects of the present disclosure. In some examples, these operations may be performed by a system including a processor executing a set of codes to control functional elements of an apparatus. In some cases, the operations may refer to, or be performed by, an ANN as described with reference to FIGS. 1 and 4.

Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

Accordingly, at operation 700, the system receives a referral expression and a video including a set of image frames. For example, the video may show a man riding a skateboard as shown in FIG. 3, and the referral expression may include the natural language "a man riding a skateboard."

At operation 705, the system generates a first image mask based on the referral expression and a first image frame of the set of image frames. In some examples, a video object segmentation network takes three types of input—a target image, memory images and corresponding mask predictions, and a language expression. Since there is no previous mask prediction for the first frame, a two-stage procedure for inference is introduced. At the first stage, the video object segmentation network would operate without any memory frames. It results in mask predictions from each frame independently using only a language expression. After obtaining initial masks, the video object segmentation network selects an anchor frame, which has the most confident mask prediction to the language expression. The confidence score of each frame is calculated by averaging the final segmentation scores over a spatial axis.

At the second stage, initial segmentation results are updated from the anchor with the full network. First, an anchor frame is set as memory frame. The object mask is re-estimated with both cross-model attention and memory attention from the anchor frame to the start and the end of a video, respectively. After making a new prediction for each frame, the memory is updated by adding an estimated mask and image. To alleviate potential memory overflow issue, a maximum number of memory frames is predetermined and set as T. If the number of memory frames reaches T, then the least confident frame in the memory is replaced with a new prediction.

At operation 710, the system generates a second image mask based on the referral expression, the first image frame, the first image mask (which are now stored as memory frames), and a second image frame of the set of image frames (i.e., a current target frame). That is, the video object segmentation network utilizes previous mask predictions in the memory frames and estimates the mask of a target frame. At the same time, the language expression is still used as guidance during the second stage, which helps handle challenging scenarios like drifting and occlusions. The two-stage inference scheme can recursively refine segmentation results by repeating the second stage from a new anchor.

At operation 715, the system generates annotation information for the video including the first image mask overlaid on the first image frame and the second image mask overlaid on the second image frame. For example, the annotation information can highlight a foreground image as it moves against a background, as illustrated by the shading of the man riding the skateboard in FIG. 3.

According to embodiments of the present disclosure, the unified network framework produces fine segmentation results with sharp boundaries on various videos and queries. The described network framework can handle occlusion, shape deformation, and target identification successfully.

Training and Evaluation

Figure 8:
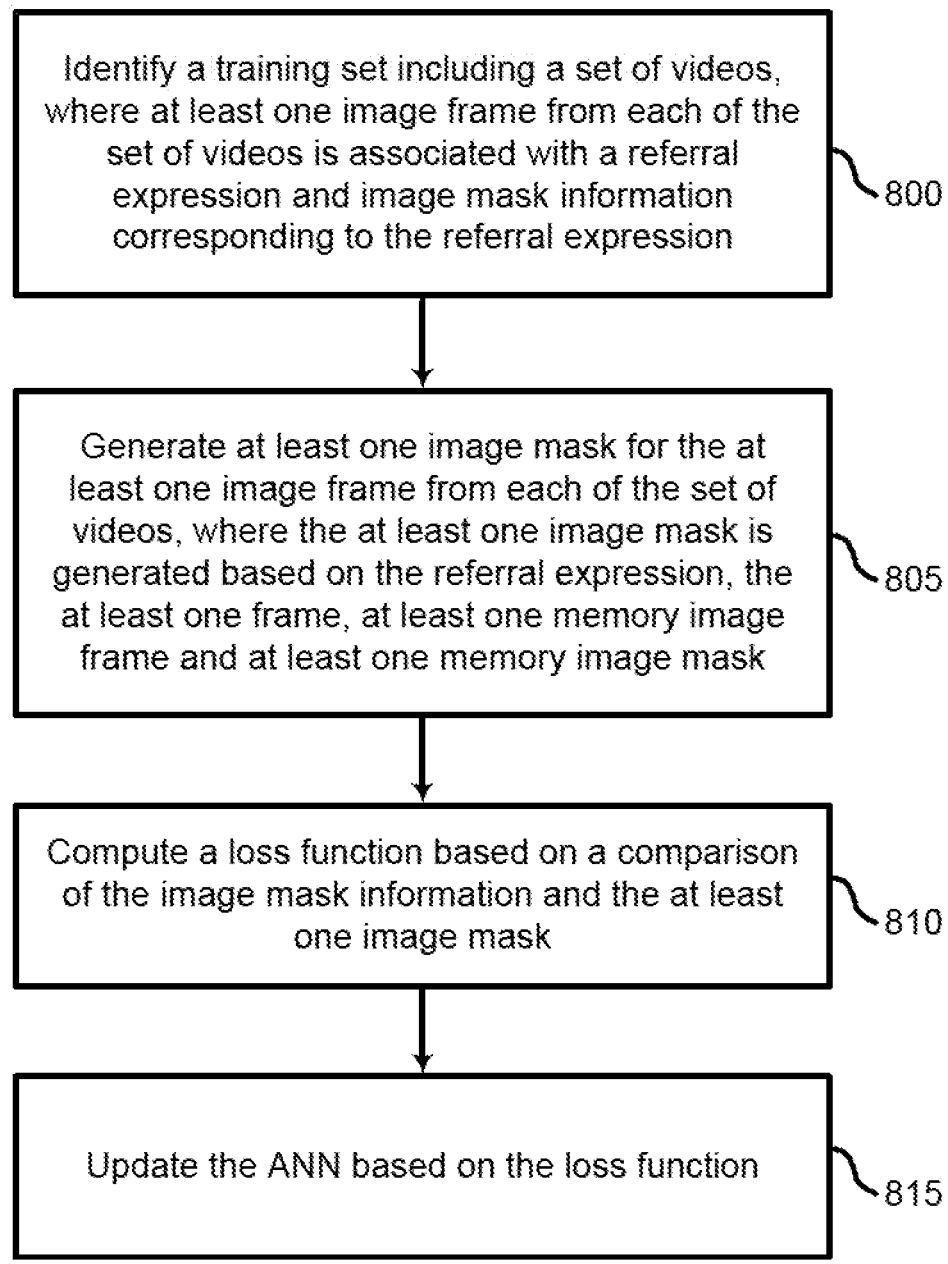

FIG. 8 shows an example of a process for video object segmentation according to aspects of the present disclosure. In some examples, these operations may be performed by a system including a processor executing a set of codes to control functional elements of an apparatus.

Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

Embodiments of the present disclosure employ a backbone network initialized by weights which are pre-trained on an image dataset. In one example, each frame of an input video may be resized to 320×320. The maximum length of words L may be 20. $C_e$ may be set to 1000 (i.e., embedding each word to a 1000-dimensional embedding space). Then, an optimizer trains a video object segmentation network framework on a batch size of 16. The video object segmentation network framework may be trained end-to-end in 120 epochs. A learning rate may be initialized as $2 \times 10^{-5}$ and is decayed by a factor of 10 at 80 epochs. A maximum number of memory frames T may be set to 4.

At operation 800, the system identifies a training set including a set of videos, where at least one image frame from each of the set of videos is associated with a referral expression and image mask information corresponding to the referral expression. In some cases, the operations of this step may refer to, or be performed by, a training component as described with reference to FIG. 1.

At operation 805, the system generates at least one image mask for the at least one image frame from each of the set of videos, where the at least one image mask is generated based on the referral expression, the at least one frame, at least one memory image frame and at least one memory image mask. In some cases, the operations of this step may refer to, or be performed by, an ANN as described with reference to FIGS. 1 and 4.

At operation 810, the system computes a loss function based on a comparison of the image mask information and the at least one image mask. In some cases, the operations of this step may refer to, or be performed by, a training component as described with reference to FIG. 1.

At operation 815, the system updates the ANN based on the loss function. In some cases, the operations of this step may refer to, or be performed by, a training component as described with reference to FIG. 1.

A benchmark dataset for a video object segmentation task is described as follows. In one example, a training set may include 138 objects in 59 videos while a validation set may include 59 objects in 30 videos. Each video has high-resolution videos and annotations, and includes many realistic scenarios, such as occlusions, multi-object interactions, and camera motion. A unified network framework and other model variances may be trained on this benchmark dataset. Because this benchmark dataset may not have enough videos to train from the scratch, baselines and a described unified network framework are both pre-trained on a large-scale database. Afterwards, a baseline and the described unified framework are further fine-tuned on the benchmark dataset.

Compared to a network which uses a referring image segmentation benchmark for pre-training, the unified network framework may achieve a performance gain through exploiting the large-scale dataset and obtaining temporal consistency among frames during training. One embodiment of the present disclosure shows that a pre-training-only-model achieves better performance with fine-tuning.

A large-scale dataset may be split into a training set and a validation set. Variations of the network may be trained in order to evaluate performance. A "Baseline" network may refer to a variant of an image-based model with a balanced feature pyramid decoder. "Baseline+RNN" model extends a "Baseline" model, takes multiple frames as input, and applies a GRU layer among visual features of frames before cross-modal attention module. "Baseline+RNN" model encodes sequential natures and exploit temporal information. "Without memory attention" is an ablation model in which a memory attention module is dropped during training and inference procedure.

According to experimental evidence, a full model (i.e., a unified network framework including both cross-modal attention and memory attention) achieves performance gain over "Baseline", "Baseline+RNN", and an ablation model. The performance gain demonstrates the importance of having a memory attention module and of leveraging temporal information in a referring video object segmentation task.

According to certain embodiments, a two-stage scheme for inference is compared to some benchmark inference procedures. As a baseline, "Forward" scheme can obtain the mask of the first frame and propagate to forward direction with a previous frame for each step until the end of the video. One embodiment of the present disclosure presents a two-stage inference scheme referred to as "Anchor+Confident". Another embodiment presents a two-stage inference scheme referred to as "Anchor+Previous". Both inference schemes obtain a mask for each frame independently, and then set a most confident frame as an anchor frame for the next stage. The "Anchor+Previous" uses the previous T frames as memory frames during the second stage, while the "Anchor+Confident" uses the most confident T frames as memory frames.

One embodiment of the present disclosure selects an anchor by identifying the most confident frame in a video and conducts bidirectional propagation from the selected frame. Another embodiment iterates the second stage of two-stage inference scheme multiple times. This is referred to as an iterative inference procedure.

Two standard evaluation metrics may be used to evaluate performance—region similarity ($\mathcal{J}$) and contour accuracy ($\mathcal{F}$). Evaluation metrics include prec@X, the percentage of correctly segmented video frames in an entire dataset, of which $\mathcal{J}$ score of each frame for all videos is higher than a pre-set threshold X. In one example, five different threshold values may be set ranging from 0.5 to 0.9.

In one experiment, "Anchor+Confident" produces improved performance (45.27 of $\mathcal{J}$ and 49.19 of $\mathcal{F}$). An embodiment of the "Forward" scheme produces 43.13 of $\mathcal{J}$ and 49.07 of $\mathcal{F}$. An embodiment of the "Anchor+Previous" scheme produces 44.58 of $\mathcal{J}$ and 49.14 of $\mathcal{F}$. The combined results verify that having anchor and confident memory frames may contribute to better segmentation results. In one example, multiple iterations of the second stage improve accuracy from 41.34 of $\mathcal{J}$ (stage 1) to 45.44 of $\mathcal{J}$ (stage 2 with 4 iterations).

Ablations studies may be conducted on annotation type. Two types of annotations are generated on a training set and a validation set. A "full-video expression" refers to annotators provided with an entire video for annotation, while a "first-frame expression" refers to annotators provided with the first frame of each video. For a same validation set, a full-video expression scheme may produce superior results to a first-frame expression scheme if the full-video expression contains more relevant and richer information of video than the first-frame expression. Using both full-video and first-frame expression may improve performance.

To verify the importance of dataset scale in model performance, experiments may be conducted with different subsets of a large-scale dataset. Each subset may have different number of samples. Four different subsets, 10%, 20%, 30% and 50% of all samples, are used in training. A unified network framework may be validated on the same validation set with all the samples. Experiments show the performance gradually improves as dataset scale increases, which demonstrates the value of having a large-scale dataset for referring video object segmentation task.

Accordingly, the present disclosure includes the following embodiments.

A method for video object segmentation is described. Embodiments of the method may include receiving a referral expression and a video comprising a plurality of image frames, generating a first image mask based on the referral expression and a first image frame of the plurality of image frames, generating a second image mask based on the referral expression, the first image frame, the first image mask, and a second image frame of the plurality of image frames, and generating annotation information for the video including the first image mask overlaid on the first image frame and the second image mask overlaid on the second image frame.

An apparatus for video object segmentation is described. The apparatus may include a processor, memory in electronic communication with the processor, and instructions stored in the memory. The instructions may be operable to cause the processor to receive a referral expression and a video comprising a plurality of image frames, generate a first image mask based on the referral expression and a first image frame of the plurality of image frames, generate a second image mask based on the referral expression, the first image frame, the first image mask, and a second image frame of the plurality of image frames, and generate annotation information for the video including the first image mask overlaid on the first image frame and the second image mask overlaid on the second image frame.

A non-transitory computer readable medium storing code for video object segmentation is described. In some examples, the code comprises instructions executable by a processor to: receive a referral expression and a video comprising a plurality of image frames, generate a first image mask based on the referral expression and a first image frame of the plurality of image frames, generate a second image mask based on the referral expression, the first image frame, the first image mask, and a second image frame of the plurality of image frames, and generate annotation information for the video including the first image mask overlaid on the first image frame and the second image mask overlaid on the second image frame.

Some examples of the method, apparatus, and non-transitory computer readable medium described above may further include generating an expression embedding for the referral expression, wherein the expression embedding comprises a semantic information and position information for each word of the referral expression, and wherein the first image mask and the second image mask are based on the expression embedding.

Some examples of the method, apparatus, and non-transitory computer readable medium described above may further include combining information from the first image frame and the referral expression to produce a cross-modal feature vector. Some examples may further include apply a self-attention process to the cross-modal feature vector to produce a cross-attention vector, wherein the first image mask is based on the cross-attention vector.

In some examples, the information from the first image is drawn from a second intermediate stage of an image encoder. In some examples, the cross-attention vector is fed to a first refinement stage of a decoder.

Some examples of the method, apparatus, and non-transitory computer readable medium described above may further include combining information from the first image frame and the first image mask to produce a memory feature vector. Some examples may further include apply an attention process to the memory feature vector and information from the second image frame to produce a memory attention vector, wherein the second image mask is based on the memory attention vector.

In some examples, the information from the second image frame is drawn from a first intermediate stage of an image encoder. In some examples, the memory attention vector is fed to a second refinement stage of a decoder.

Some examples of the method, apparatus, and non-transitory computer readable medium described above may further include generating a third image mask based on the referral expression, the first image frame, the first image mask, the second image frame, the second image mask, and a third image frame from the plurality of image frames, wherein the annotation information comprises the third image mask overlaid on the third image frame.

Some examples of the method, apparatus, and non-transitory computer readable medium described above may further include generating a plurality of image masks corresponding to the plurality of image frames. Some examples may further include identifying a confidence score for each of the plurality of image masks. Some examples may further include selecting an anchor frame based at least in part on the confidence score identified for each of the plurality of image masks, wherein an image mask for the anchor frame is generated without using a memory frame or a memory mask and subsequent image masks are generated using at least one memory frame and at least one corresponding memory mask.

A method of training an artificial neural network (ANN) for video object segmentation is described. Embodiments of the method may identifying a training set comprising a plurality of videos, wherein at least one image frame from each of the plurality of videos is associated with a referral expression and image mask information corresponding to the referral expression, generating at least one image mask for the at least one image frame from each of the plurality of videos, wherein the at least one image mask is generated based on the referral expression, the at least one frame, at least one memory image frame and at least one memory image mask, computing a loss function based on a comparison of the image mask information and the at least one image mask, and updating the ANN based on the loss function.

An apparatus for video object segmentation is described. The apparatus may include a processor, memory in electronic communication with the processor, and instructions stored in the memory. The instructions may be operable to cause the processor to identify a training set comprising a plurality of videos, wherein at least one image frame from each of the plurality of videos is associated with a referral expression and image mask information corresponding to the referral expression, generate at least one image mask for the at least one image frame from each of the plurality of videos, wherein the at least one image mask is generated based on the referral expression, the at least one frame, at least one memory image frame and at least one memory image mask, compute a loss function based on a comparison of the image mask information and the at least one image mask, and update the ANN based on the loss function.

A non-transitory computer readable medium storing code for video object segmentation is described. In some examples, the code comprises instructions executable by a processor to: identify a training set comprising a plurality of videos, wherein at least one image frame from each of the plurality of videos is associated with a referral expression and image mask information corresponding to the referral expression, generate at least one image mask for the at least one image frame from each of the plurality of videos, wherein the at least one image mask is generated based on the referral expression, the at least one frame, at least one memory image frame and at least one memory image mask, compute a loss function based on a comparison of the image mask information and the at least one image mask, and update the ANN based on the loss function.

Some examples of the method, apparatus, and non-transitory computer readable medium described above may further include combining information from the first image frame and the referral expression to produce a cross-modal feature vector. Some examples may further include apply a self-attention process to the cross-modal feature vector to produce a cross-attention vector, wherein the first image mask is based on the cross-attention vector.

In some examples, the information from the first image is drawn from a second intermediate stage of an image encoder. In some examples, the cross-attention vector is fed to a first refinement stage of a decoder.

Some examples of the method, apparatus, and non-transitory computer readable medium described above may further include combining information from the first image frame and the first image mask to produce a memory feature vector. Some examples may further include apply an attention process to the memory feature vector and information from the second image frame to produce a memory attention vector, wherein the second image mask is based on the memory attention vector.

In some examples, the information from the second image frame is drawn from a first intermediate stage of an image encoder. In some examples, the memory attention vector is fed to a second refinement stage of a decoder.

An apparatus for video object segmentation is described. Embodiments of the apparatus may include an image encoder configured to generate an image feature vector based on an image frame, a language encoder configured to produce an expression embedding based on a referral expression, a cross-attention module configured to generate a cross-attention vector based on the image frame and the expression embedding, a memory encoder configured to generate a memory feature vector based on a memory image frame and a memory image mask, a memory attention module configured to generate a memory attention vector based on the memory feature vector and a first output of the image encoder, and a decoder configured to generate an image mask based on the image feature vector, the cross-attention vector, and the memory attention vector.

A method of manufacturing an apparatus for video object segmentation is described. The method may include providing an image encoder configured to generate an image feature vector based on an image frame, providing a language encoder configured to produce an expression embedding based on a referral expression, providing a cross-attention module configured to generate a cross-attention vector based on the image frame and the expression embedding, providing a memory encoder configured to generate a memory feature vector based on a memory image frame and a memory image mask, providing a memory attention module configured to generate a memory attention vector based on the memory feature vector and a first output of the image encoder, and providing a decoder configured to generate an image mask based on the image feature vector, the cross-attention vector, and the memory attention vector.

In some examples, the image encoder comprises a first intermediate stage configured to provide first feature information to the decoder and a second intermediate stage configured to provide second feature information to the decoder. In some examples, the decoder comprises a first refinement stage configured to receive the cross-attention vector and a second refinement stage configured to receive the memory feature vector.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
receiving a video and a referral expression, wherein the video comprises a first image frame and a second image frame, and wherein the referral expression is a natural language expression identifying an object in the video;
encoding the referral expression using a neural network language encoder to obtain an encoded referral expression;
generating image mask information comprising a first image mask generated based on the encoded referral expression and the first image frame, and a second image mask generated based on the encoded referral expression, the second image frame and the first image mask; and
generating video object segmentation information indicating a presence of the object corresponding to the referral expression in the video, wherein the video object segmentation information includes the first image mask overlaid on the first image frame and the second image mask overlaid on the second image frame.

2. The method of claim 1, wherein generating the image mask information further comprises:
encoding the first image frame using an image encoder;
generating the first image mask based at least in part on the encoded first image frame and the encoded referral expression;
storing the first image mask and the first image frame in a memory frame storage;
encoding the second image frame using the image encoder;
encoding the stored first image frame together with the stored first image mask using a memory encoder to produce an encoded memory frame; and
generating the second image mask based on the encoded second image frame, the encoded memory frame, and the encoded referral expression.

3. The method of claim 1, wherein generating the first image mask and the second image mask further comprises:
generating an expression embedding for the referral expression using a language encoder, wherein the expression embedding comprises a semantic information and position information for each word of the referral expression, and wherein the first image mask and the second image mask are based on the expression embedding.

4. The method of claim 1, wherein generating the first image mask further comprises:
combining information from the first image frame and the encoded referral expression to produce a cross-modal feature vector; and
applying a self-attention process to the cross-modal feature vector to produce a cross-attention vector, wherein the first image mask is based on the cross-attention vector.

5. The method of claim 4, further comprising:
drawing the information from the first image frame from a second intermediate stage of an image encoder.

6. The method of claim 4, further comprising:
feeding the cross-attention vector to a first refinement stage of a decoder.

7. The method of claim 1, wherein generating the second image mask further comprises:
combining information from the first image frame and the first image mask to produce a memory feature vector; and
applying an attention process to the memory feature vector and information from the second image frame to produce a memory attention vector, wherein the second image mask is based on the memory attention vector.

8. The method of claim 7, further comprising:
drawing the information from the second image frame from a first intermediate stage of an image encoder.

9. The method of claim 7, further comprising:
feeding the memory attention vector is to a second refinement stage of a decoder.

10. The method of claim 1, further comprising:
generating a third image mask based on the referral expression, the first image frame, the first image mask, the second image frame, the second image mask, and a third image frame from the video, wherein the video object segmentation information includes the third image mask overlaid on the third image frame.

11. The method of claim 1, further comprising:
generating a plurality of image masks corresponding to a plurality of image frames;
identifying a confidence score for each of the plurality of image masks; and
selecting an anchor frame based at least in part on the confidence score identified for each of the plurality of image masks, wherein an image mask for the anchor frame is generated without using a memory frame or a memory mask and subsequent image masks are generated using at least one memory frame and at least one corresponding memory mask.

12. A method for training an artificial neural network (ANN) for image processing, comprising:
identifying a training set comprising a plurality of videos, wherein at least one image frame from each of the plurality of videos is associated with a referral expression and image mask information corresponding to the referral expression, and wherein the referral expression is a natural language expression identifying an object in the video;
encoding the referral expression using a neural network language encoder to obtain an encoded referral expression;
generating at least one image mask for the at least one image frame from each of the plurality of videos, wherein the at least one image mask is generated based on the encoded referral expression, the at least one frame, at least one memory image frame and at least one memory image mask;

computing a loss function based on a comparison of the image mask information and the at least one image mask; and updating the ANN based on the loss function.

13. The method of claim 12, wherein generating at least one image mask further comprises:

combining information from the at least one image frame and the encoded referral expression to produce a cross-modal feature vector; and applying a self-attention process to the cross-modal feature vector to produce a cross-attention vector, wherein the at least one image mask is based on the cross-attention vector.

14. The method of claim 13, further comprising:

drawing the information from a first image frame from a second intermediate stage of an image encoder; and feeding the cross-attention vector is to a first refinement stage of a decoder.

15. The method of claim 12, further comprising:

combining information from the at least one image frame and the at least one image mask to produce a memory feature vector; and applying an attention process to the memory feature vector and information from a second image frame to produce a memory attention vector, wherein a second image mask is based on the memory attention vector.

16. The method of claim 15, further comprising:

drawing the information from the second image frame from a first intermediate stage of an image encoder.

17. The method of claim 15, further comprising:

feeding the memory attention vector to a second refinement stage of a decoder.

18. An apparatus for image processing, comprising:

a memory; and at least one processor, wherein the at least one processor is configured to process instructions stored in the memory to cause:

an image encoder to generate an image feature vector based on an image frame;

a language encoder to produce an expression embedding based on a referral expression, wherein the referral expression is a natural language expression identifying an object in a video;

a cross-attention module to generate a cross-attention vector based on the image frame and the expression embedding;

a memory encoder to generate a memory feature vector based on a memory image frame and a memory image mask;

a memory attention module to generate a memory attention vector based on the memory feature vector and the image feature vector; and a decoder to generate video object segmentation information indicating a presence of an object corresponding to the referral expression, wherein the video object segmentation information includes the memory image mask overlaid on the memory image frame and an image mask overlaid on the image frame, wherein the memory image mask is generated based on the memory image frame and the referral expression, and wherein the image mask is generated based on the image feature vector, the cross-attention vector, and the memory attention vector.

19. The apparatus of claim 18, wherein:

the image encoder comprises a first intermediate stage configured to provide first feature information to the decoder and a second intermediate stage configured to provide second feature information to the decoder.

20. The apparatus of claim 18, wherein:

the decoder comprises a first refinement stage configured to receive the cross-attention vector and a second refinement stage configured to receive the memory feature vector.

* * * * *